United States Patent Office 3,161,678
Patented Dec. 15, 1964

3,161,678
PROCESS FOR MAKING "ORTHO-CHLORO-PROCAINE AMIDE"
Michel Thominet, Paris, France, assignor, by mesne assignments, to Société d'Etudes Scientifiques et Industrielles de l'Ile de France, Paris, France, a corporation of France
No Drawing. Filed Dec. 17, 1956, Ser. No. 628,512
3 Claims. (Cl. 260—558)

The present invention relates to a new compound, ortho-chloro-procaine amide or N(diethyl-amino-ethyl)-ortho-chloro-para-amino-benzamide,

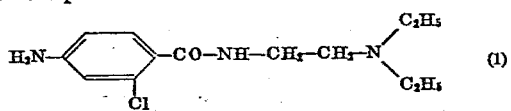

and to a method of preparing this new compound.

A number of substituted benzamides have been prepared in the past for their anaesthetic and antipyretic properties. In particular, the sulphate derivative of procaine amide has been prepared by Abbott, and used as an antipyretic agent. As far as is known, however, ortho-chloro-procaine amide has never previously been prepared.

The surprising fact has now been discovered that ortho-chloro-procaine amide, prepared by this new method, possesses valuable and unexpected antinaupathic or antiemetic properties, which make this compound a very interesting therapeutic agent against vomiting.

It is therefore an object of the invention to provide the new and useful compound ortho-chloro-procaine amide. Another object of the invention is the establishment of a process for preparing this compound. Other objects and advantages will appear from the further description of the invention as given below.

The attainment of the above objects is made possible by the instant invention, including a process in which 2-chloro-4-nitrobenzoyl chloride is subjected to the action of N-N diethyl-ethylene-diamine in an inert liquid medium wherein the resulting hydrochloride is substantially insoluble, thereby enabling the said hydrochloride to be separated from the liquid medium by filtration or centrifuging, and finally reducing the separated hydrochloride in order to produce the desired ortho-chloro-procaine amide.

The first step of the process is illustrated by the formula:

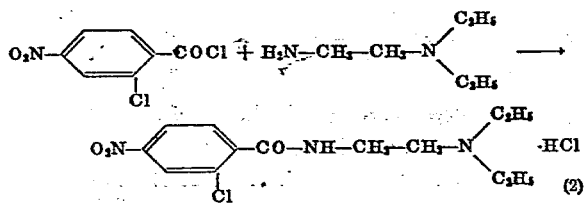

and the second step consists to reducing the NO₂ or nitro group in the NH₂ or amino group according to the reaction:

$$-NO_2 + 3H_2 \rightarrow -NH_2 + 2H_2O \qquad (3)$$

As stated above, the liquid medium in which the first or condensation step is carried out is an inert liquid medium in which the nitro derivative hydrochloride of reaction 2 is insoluble, and may therefore be separated by a simple physical operation such as filtration or centrifuging. The liquid medium is preferably acetone, but other similar solvents may be employed, and especially benzene, toluene, ether, etc. More generally, solvents are used which are liquid at the reaction temperature of the process, i.e. preferably about 10° C., and which have boiling points at at least 30° C.

The following example is illustrative of the instant invention and is not to be regarded as limitative:

EXAMPLE

A solution of 58 grams of N-N diethyl-ethylene-diamine in 200 ml. of pure acetone are placed in a flask equipped with a stirrer, thermometer and cooling system. To this solution, there were added slowly, while stirring, 110 grams of 2-chloro-4-nitro-benzoyl chloride dissolved in 100 ml. of pure acetone, the temperature of the reaction mixture being maintained below 10° C.

After the completion of the reaction, the hydrochloride of N(diethyl-amino-ethyl)-2-chloro-4-nitro-benzamide is recovered from the liquid medium by centrifuging.

The recovered hydrochloride is dissolved in water and may be reduced to the corresponding amino-compound, according to reaction 3 by several methods known in the art (see for example K. Johnson and E. F. Degering, J. Amer. Chem. Soc. 1939, 61, 3194). Reduction with iron and hydrochloric acid or catalytic hydrogenation in the presence of Raney nickel give the best results, but sodium sulphide, tin and hydrochloric acid, chloride of tin, etc., may be used.

An excess of sodium hydroxide is then added to precipitate the base of the amino-compound, which is then separated and dissolved in absolute ethanol.

The alcoholic solution of the base of the amino-compound is treated with gaseous hydrochloric acid, thereby precipitating in substantially its theoretical quantity, the di-hydrochloride of ortho-chloro-procaine amide which is easily separated as a pure compound by mere centrifuging. The product has a melting point of 145–150° C.

The product is valuable as an anti-vomiting or antiemetic agent, as shown by the results of the following experiments and observations made on animals and human beings.

(A) Experiments On Dogs

The emetic agent used was apomorphine injected at a dosage of 0.1 mg./kg. and the number of vomits in the half-hour following the injection were noted. Four days later, the experiment was repeated, with the difference that the dogs were previously treated with a dose of 10 mg./kg. of the anti-emetic product according to the invention, administered through the mouth, and the number of vomits in the half-hour following the injection of apomorphine were again noted.

In the first case, the number of vomits in the half-hour following treatment was 4.5 per animal, and in the second case the number of vomits was reduced to 1.5 per animal, giving a protection of 66% due to the use of the ortho-chloro-procaine amide.

An increase in the preventive dose of ortho-chloro-procaine amide to 20 mg./kg., again administered through the mouth, gave a complete protection (100%) to the animals against vomiting induced by apomorphine.

In a further similar experiment with dogs, in which apomorphine had produced an average number of four vomits per dog without prior treatment with the present anti-emetic, the preventive administration of ortho-chloro-procaine amide by sub-cutaneous injection of a dose of 10 mg./kg. completely protected the dogs against the emetic effect of the apomorphine.

(B) Clinical Observations

In the clinical field, ortho-chloro-procaine amide has also been shown to possess antinaupathic properties together with an excellent tolerance. The ortho-chloroprocaine amide was tested in the form of injection ampoules containing doses of 100 mg. per ampoule.

*Observation 1.*—Cases of ethylic poisoning subjected to treatment by means of apomorphine administered by parenteral methods did not react to their daily doses of emetic, after previous treatment with orthochloro-procaine amide.

*Observation 2.*—Mrs. A . . ., 63 years of age, was operated on for calculous cholecystitis. Two days after the operation, there were observed:

- On the one hand, very frequent vomiting;
- On the other hand, salvos of extra-ventricular contractions. This was furthermore an old coronary case with anginal series of infarction of the myocardium.

Two ampoules of ortho-chloro-procaine amide were injected for two days.

At the end of 48 hours treatment, the patient had ceased to vomit and her electro-cardiogram showed that the extra-contractions had total disappeared.

*Observation 3.*—Mrs. O . . . was brought in with constant vomiting, which was first of all attributed to pyloric stenosis and then to vesicular lithiasis.

This patient was treated with two ampoules per day of ortho-chloro-procaine amide by sub-cutaneous injection, for a period of two days.

During the whole duration of the treatment, the patient's vomiting ceased.

The local and general tolerance were excellent.

The above experiments on animals and the clinical observations on human patients clearly show the valuable anti-emetic properties of the ortho-chloro-procaine amide.

While this invention has been disclosed and described with respect to certain aspects of the novel compound produced and of the process for producing this compound, various modifications and variations will become apparent to persons skilled in the art. It is to be understood that such modifications and variations fall within the spirit and the scope of the present invention, as ascertained and defined in the appended claims.

What I claim is:

1. In the production of

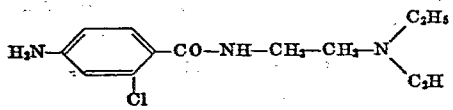

by reacting

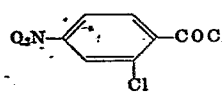

with

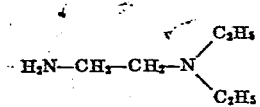

at lowered temperatures, and reduction of the resulting hydrochloride of N(diethyl-amino-ethyl)-2-chloro-4-nitro-benzamide, the improvement which comprises conducting said first mentioned reaction in the presence of acetone solvent whereby substantially only the nitro-benzamide product formed precipitates out of the acetone solvent, separating the nitro-benzamide product from the solvent in which impurities remain, thereby providing the nitro-benzamide in a condition of purity ready for the reduction step.

2. A process for the production of

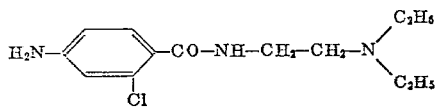

which consists substantially only in reacting

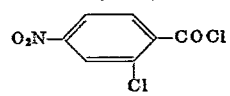

with

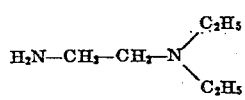

during cooling, in the presence of acetone solvent, thereby forming the hydrochloride of N(diethyl-amino-ethyl)-2-chloro-4-nitro-benzamide as a precipitate in the acetone solvent, separating the precipitate from the acetone solution, and subjecting the precipitate to a reduction action which converts the nitro-benzamide to

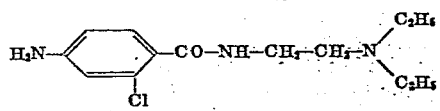

3. A process for the production of

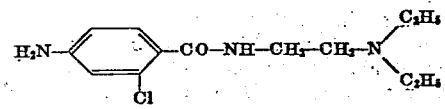

which consists substantially only in slowly adding

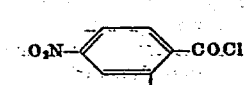

in acetone solution to

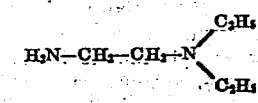

also in acetone solution while mixing and maintaining the reaction mixture at lowered temperatures thereby forming the hydrochloride of N(diethyl-amino-ethyl)-2-chloro-4-nitro-benzamide as a precipitate in the acetone solvent, separating the precipitate from the acetone solution, and subjecting the precipitate to a reduction action which converts the nitro-benzamide to

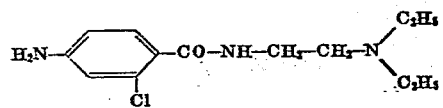

References Cited in the file of this patent

UNITED STATES PATENTS

| | | |
|---|---|---|
| 2,233,296 | Nelles et al. | Feb. 25, 1941 |
| 2,617,824 | Moore et al. | Nov. 11, 1952 |
| 2,785,200 | Moore | Mar. 12, 1957 |

OTHER REFERENCES

Yamazaki et al.: Chem. Abs., vol. 48, p. 2003 (1954).
Johnson et al.: J. A. C. S., vol. 61, 3194 (1939).

UNITED STATES PATENT OFFICE
CERTIFICATE OF CORRECTION

Patent No. 3,161,678                                December 15, 1964

Michel Thominet

It is hereby certified that error appears in the above numbered patent requiring correction and that the said Letters Patent should read as corrected below.

Column 3, line 8, for "Mrs. A" read -- Mrs. M --; line 14, for "infarction" read -- infraction --; same column 3, lines 49 to 52, the formula should appear as shown below instead of as in the patent:

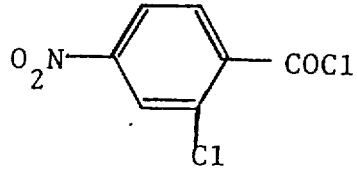

(SEAL)         Signed and sealed this 3rd day of August 1965.

Attest:

ERNEST W. SWIDER                             EDWARD J. BRENNER
Attesting Officer                                  Commissioner of Patents